US010320214B2

(12) United States Patent
Horie et al.

(10) Patent No.: US 10,320,214 B2
(45) Date of Patent: Jun. 11, 2019

(54) POWER TOOL

(71) Applicant: Hitachi Koki Co., Ltd., Tokyo (JP)

(72) Inventors: Yuki Horie, Hitachinaka (JP); Kazuhiko Funabashi, Hitachinaka (JP); Nobuhiro Takano, Hitachinaka (JP)

(73) Assignee: Koki Holdings Co., Ltd., Tokyo (JP)

( * ) Notice: Subject to any disclaimer, the term of this patent is extended or adjusted under 35 U.S.C. 154(b) by 389 days.

(21) Appl. No.: 14/410,797

(22) PCT Filed: Aug. 29, 2013

(86) PCT No.: PCT/JP2013/005128
§ 371 (c)(1),
(2) Date: Dec. 23, 2014

(87) PCT Pub. No.: WO2014/034129
PCT Pub. Date: Mar. 6, 2014

(65) Prior Publication Data

US 2015/0171654 A1 Jun. 18, 2015

(30) Foreign Application Priority Data

Aug. 30, 2012 (JP) ................................ 2012-189921

(51) Int. Cl.
*H02J 7/00* (2006.01)
*B25F 5/00* (2006.01)

(52) U.S. Cl.
CPC .............. *H02J 7/0063* (2013.01); *B25F 5/00* (2013.01)

(58) Field of Classification Search
CPC . H02J 7/0063; H02J 7/0065; H02J 2007/0067
(Continued)

(56) References Cited

U.S. PATENT DOCUMENTS 5,945,806 A * 8/1999 Faulk .................. H01M 10/425 320/127
6,087,815 A * 7/2000 Pfeifer ...................... B25F 5/00 323/282

(Continued)

FOREIGN PATENT DOCUMENTS

CN 1429421 A 7/2003
CN 1862909 A 11/2006

(Continued)

OTHER PUBLICATIONS

German Patent Office office action for application DE112013004220.7 (dated Mar. 18, 2016).

(Continued)

*Primary Examiner* — Stephen F. Gerrity
*Assistant Examiner* — Joshua G Kotis
(74) *Attorney, Agent, or Firm* — Kilpatrick Townsend & Stockton, LLP

(57) ABSTRACT

A power tool includes: a secondary battery; a drive unit; a detecting unit; and a control unit. The secondary battery has positive and negative terminals across which a battery voltage is developed. The drive unit is connected to the secondary battery. The detecting unit is configured to detect a current value and a voltage value supplied from the secondary battery to the drive unit. The control unit is configured to control an effective voltage and an effective current applied to the drive unit depending on a load imposed thereon to fall within an allowable power dissipation value.

7 Claims, 2 Drawing Sheets

(58) Field of Classification Search
USPC .................................. 173/217; 320/135, 136
See application file for complete search history.

(56) References Cited

U.S. PATENT DOCUMENTS

| | | | | |
|---|---|---|---|---|
| 6,172,860 | B1 | 1/2001 | Yoshimizu et al. | |
| 6,286,609 | B1 | 9/2001 | Carrier et al. | |
| 6,479,958 | B1 * | 11/2002 | Thompson ................ | B25F 5/00 318/430 |
| 6,891,342 | B2 * | 5/2005 | Nakamura ............ | H02M 3/158 318/46 |
| 7,336,048 | B2 | 2/2008 | Lohr | |
| 7,508,171 | B2 * | 3/2009 | Carrier ...................... | B25F 5/00 320/135 |
| 7,521,892 | B2 | 4/2009 | Funabashi et al. | |
| 7,688,028 | B2 * | 3/2010 | Phillips ..................... | B25F 5/00 320/106 |
| 8,231,992 | B2 | 7/2012 | Funabashi et al. | |
| 8,237,404 | B2 | 8/2012 | Takano et al. | |
| 8,988,019 | B2 * | 3/2015 | Funabashi .............. | A01D 34/78 173/217 |
| 9,065,155 | B2 | 6/2015 | Takano et al. | |
| 2003/0173940 | A1 * | 9/2003 | Kovarik ................ | H02J 7/0065 323/282 |
| 2005/0073282 | A1 * | 4/2005 | Carrier ...................... | B25F 5/00 320/106 |
| 2005/0221654 | A1 * | 10/2005 | Phillips ..................... | B25F 5/02 439/347 |
| 2006/0067025 | A1 | 3/2006 | Shinso | |
| 2006/0220605 | A1 | 10/2006 | Funabashi et al. | |
| 2008/0290826 | A1 * | 11/2008 | Nagase .................. | B62D 5/046 318/400.02 |
| 2009/0101379 | A1 * | 4/2009 | Du ............................ | H02P 7/29 173/176 |
| 2009/0108806 | A1 | 4/2009 | Takano et al. | |
| 2009/0295313 | A1 * | 12/2009 | Suzuki ...................... | B25F 5/00 318/139 |
| 2009/0305115 | A1 | 12/2009 | Funabashi et al. | |
| 2010/0084150 | A1 * | 4/2010 | Suzuki ...................... | B25F 5/00 173/2 |
| 2011/0198103 | A1 * | 8/2011 | Suzuki ...................... | B25F 5/00 173/46 |
| 2011/0250484 | A1 * | 10/2011 | Meng .................... | H01M 2/204 429/97 |
| 2012/0262035 | A1 | 10/2012 | Takano et al. | |
| 2012/0274244 | A1 * | 11/2012 | Funabashi .............. | A01D 34/78 318/139 |
| 2012/0293096 | A1 * | 11/2012 | Mizoguchi ................ | B25F 5/00 318/139 |
| 2013/0015789 | A1 * | 1/2013 | Miyazaki .................. | B25F 5/00 318/139 |
| 2013/0025893 | A1 * | 1/2013 | Ota ........................... | H02J 1/10 173/2 |
| 2013/0154584 | A1 | 6/2013 | Sakaue et al. | |
| 2013/0193891 | A1 * | 8/2013 | Wood ........................ | H02P 7/06 318/434 |
| 2013/0255980 | A1 * | 10/2013 | Linehan .................... | B25F 5/00 173/2 |
| 2013/0285476 | A1 * | 10/2013 | Nakano ................. | H02J 7/0065 307/150 |
| 2015/0333666 | A1 * | 11/2015 | Miller ....................... | H02P 4/00 318/139 |
| 2016/0250738 | A1 * | 9/2016 | Leh ..................... | B25B 23/1475 173/176 |

FOREIGN PATENT DOCUMENTS

| | | | |
|---|---|---|---|
| CN | 101154820 | A | 4/2008 |
| CN | 101292390 | A | 10/2008 |
| DE | 102005020377 | A1 | 11/2006 |
| EP | 2602064 | A1 | 6/2013 |
| JP | 11-262172 | A | 9/1999 |
| JP | 2003-526531 | A | 9/2003 |
| JP | 2004-180464 | A | 6/2004 |
| JP | 2005-117872 | A | 4/2005 |
| JP | 2006-97837 | A | 4/2006 |
| JP | 2008-178278 | A | 7/2008 |
| JP | 2011-136405 | A | 7/2011 |
| JP | 2012-35349 | A | 2/2012 |
| WO | WO2012/017833 | A1 | 2/2012 |

OTHER PUBLICATIONS

International Search Report for application PCT/JP2013/005128 (dated Feb. 28, 2014) 11 pages.

International Report on Patentability for application PCT/JP2013/005128 (dated Mar. 12, 2015), 8 pages.

Japan Patent Office office action for patent application JP2012-189921 (dated Aug. 20, 2015).

Japan Patent Office Decision of Refusal JPO patent application JP2012-189921 (dated Jan. 25, 2016).

China Intellectual Property Office office action for application 201380039554.6 dated Jul. 30, 2015.

* cited by examiner

[Fig. 1]
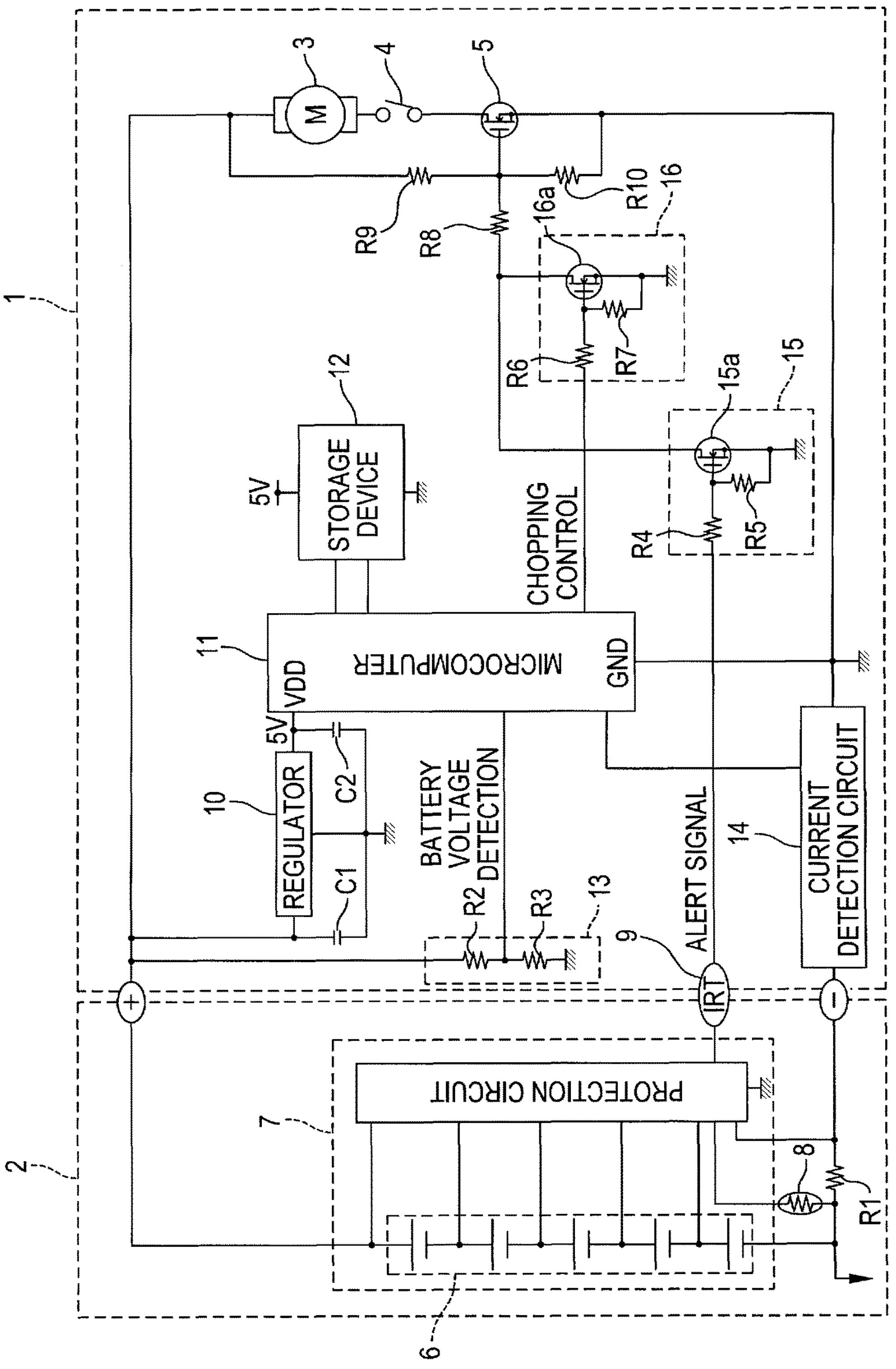

[Fig. 2]
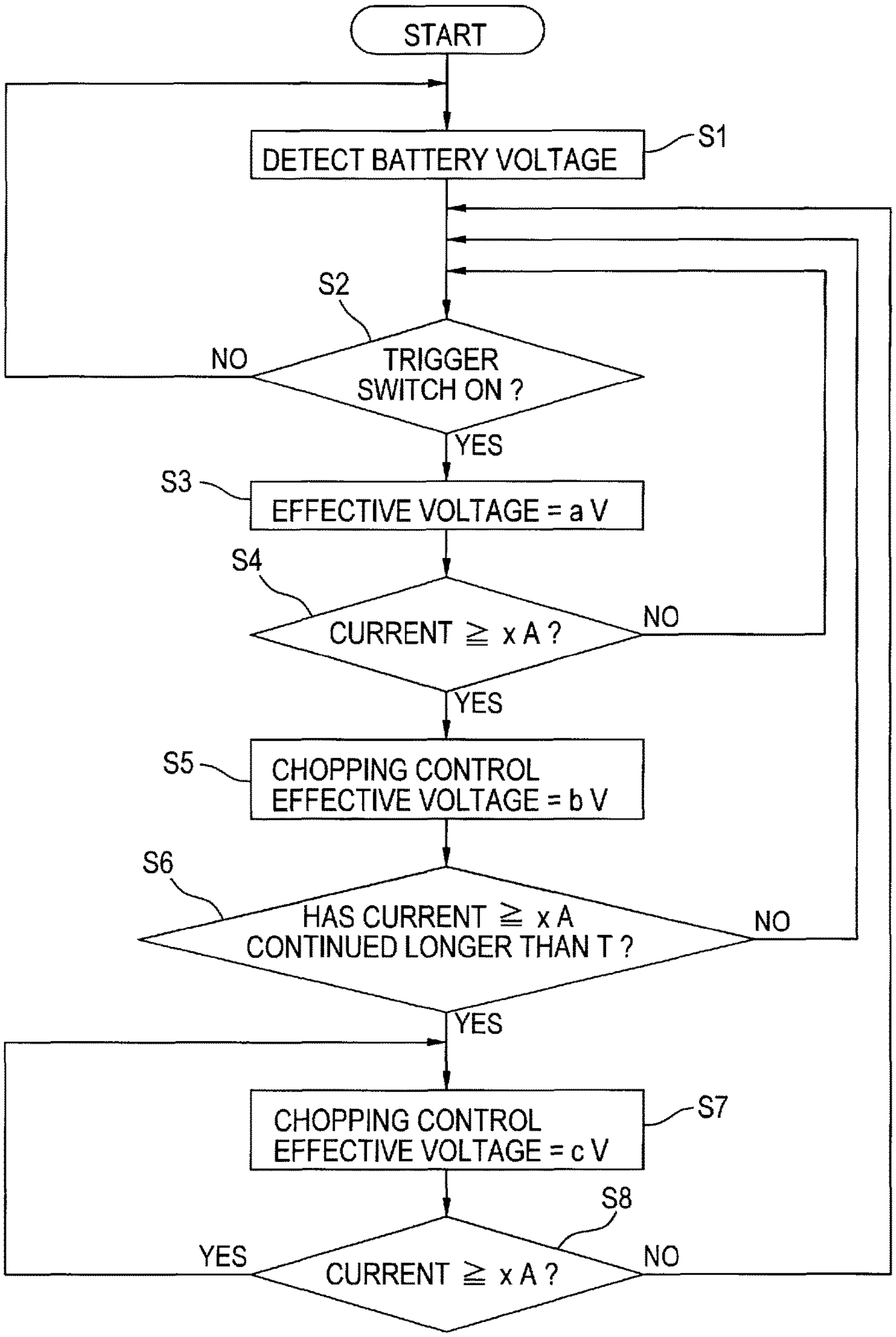

POWER TOOL

TECHNICAL FIELD

The present invention relates to a power tool that is powered by secondary batteries.

BACKGROUND ART

Battery packs housing secondary batteries are commonly used to power cordless power tools (For example, refer to Japanese Patent Application Publication No. 2011-136405). A power tool includes a motor that produces an output suited to the application of the power tool, and a control circuit configured of a field-effect transistor (FET), for example, that controls the electric current supplied to the motor. Conventionally, power tools have been provided with a specialized battery pack having a voltage and capacity suited to the output of the motor and FET. As a result, a plurality of types of battery packs exists for a plurality of types of power tools.

CITATION LIST

Patent Literature

Japanese Patent Application Publication No. 2011-136405

DISCLOSURE OF INVENTION

Solution to Problem

As described above, battery packs for conventional power tools have specialized rather than general-purpose battery packs and thus cannot be used for power tools other than the type for which they were made.

For example, a battery pack having an output of 18 V cannot be used with a power tool designed for a 14.4-V battery pack. Accordingly, a manufacturer that produces multiple types of power tools must prepare and provide individual battery packs respectively compatible with the individual power tools. At the same time, the consumer must store and keep track of each purchased power tool with the battery pack designed for use with that power tool.

Consequently, employing specialized battery packs for each power tool is a factor that inhibits low cost since the manufacturer must tack on the cost of the battery pack to each newly purchased power tool. Storing and managing each battery pack with its respective power tool can also be confusing and inconvenient for the consumer.

Further, since a specialized battery pack designed for an existing power tool cannot be used with a newly purchased power tool, the use of specialized battery packs is clearly inconvenient and uneconomical and does not meet the needs of the times. From a consumer's perspective, it would be desirable to have a singly battery pack that can be used universally with various types of power tools.

In view of the foregoing, it is an object of the present invention to provide a power tool enabling various types of battery packs to be used universally. In order to attain the above and other objects, the present invention provides a power tool including: a secondary battery having positive and negative terminals across which a battery voltage is developed; a drive unit connected to the secondary battery; a detecting unit configured to detect a current value and a voltage value supplied from the secondary battery to the drive unit; and a control unit (control FET, for example) configured to control an effective voltage and an effective current applied to the drive unit depending on a load imposed thereon to fall within an allowable power dissipation value.

With this configuration, the effective current that is consistent with the battery voltage of the battery is applied to the drive unit or control FET so as to fall within the allowable power dissipation value of the drive unit or control FET. Consequently, the power tool is capable of supplying a high-power output within the ability allowable for the power tool and promoting greater work efficiency when a battery pack having a higher battery voltage than that of a battery pack specifically designed for the power tool is used.

Preferably, the control unit executes either one of a first control and a second control, wherein the first control continuously applies the battery voltage to the drive unit, and the second control converts the battery voltage, the converted battery voltage having an effective voltage different from the battery voltage, at least one converted battery voltage being applied to the drive unit.

With this configuration, the control unit executes a plurality of controls by applying a plurality of powers having different effective voltages to the motor, including a control that directly applies the battery voltage and the current of the secondary battery to the motor. Therefore, it is possible to execute an optimal control suited for the drive situation of the drive unit.

Preferably, the battery voltage is different from a rated voltage of the drive unit. Consequently, the battery pack housing a secondary battery available for the power tool is not limited to a battery pack specifically designed for the power tool. Various types of battery packs having different battery voltages and capacities can be used for the power tool.

Preferably, the driving tool further includes a current interrupting unit configured to interrupt current flowing to the drive unit in response to an alert signal alerting that the secondary battery is about to become an abnormal state. The alert signal alerts that the secondary battery is about to become at least one of an over-discharge state, an overcurrent state in which overcurrent flows from the secondary battery, and a high-temperature state in which a temperature of the secondary battery exceeds a prescribed temperature.

Preferably, the control unit is further configured to change current from the secondary battery into different values step-by-step depending on the battery voltage by outputting a square-wave signal of prescribed frequency as a chopping control signal and varying a duty cycle of the chopping control signal. The control unit is further configured to change the current from the secondary battery by turning the current interrupting unit on and off in response to the chopping control signal. Because the current interrupting unit is also used for the chopping control, it is possible to suppress the increase of the number of the components included in the power tool even when the chopping control function is added to the power tool.

Specifically, every well-known battery can be included in the secondary battery, and the developed secondary battery is also applicable in future. However, it is preferable to use a lithium-ion battery at the time of the present application.

Advantageous Effects of Invention

The present invention enables various battery packs having different output voltages to be used with the same power tool by keeping power loss, calculated as the product of the output voltage from the mounted battery pack and the current flowing through the current interrupting unit (control FET, for example; W (watts)=A (current)*V (voltage)), from not exceeding the rated power loss of the current interrupting unit, enabling battery packs to be used universally. The structure of the present invention can also be simplified by using the current interrupting unit in chopping control to cut off the current flowing to the drive unit when the temperature of the secondary batteries exceeds a prescribed temperature (high-temperature state).

Since the rotational speed of the motor is generally greater at higher voltages, a larger load tends to be applied to the motor during startup and the locked rotor current when rotation of the motor is halted tends to increase.

Therefore, when using an 18-V battery to power a power tool equipped with a 14.4-V motor, for example, the power tool according to the present invention reduces the effective voltage of the battery through chopping control during startup in order to prevent the motor from rotating too fast (this control is referred to as a "soft start"). This prevents components in the drive unit of the motor and the like from becoming damaged. Electric current must also be restricted through a chopping control technique when the motor locks to prevent damage to the motor.

On the other hand, it is not necessary to limit current through chopping control or the like anytime other than startup (when the battery voltage is high) and motor lock (when discharge is cut off) because the load on the drive unit of the motor and the like is relatively small, provided that power dissipation in the drive unit is less than the maximum allowable. Thus, the operator can comfortably use the power tool at the maximum power possessed by the battery or motor. With the power tool according to the present invention described above, a battery pack having a different battery voltage from the voltage of the power tool can be connected to the power tool to achieve suitable operations without applying excessive load to the power tool.

BRIEF DESCRIPTION OF DRAWINGS

FIG. 1 is a circuit diagram of a power tool and a battery pack according to an embodiment of the present invention.

FIG. 2 is a flowchart illustrating operations of the power tool shown in FIG. 1.

BEST MODE FOR CARRYING OUT THE INVENTION

Next, a power tool 1 according to a preferred embodiment of the present invention will be described whole referring to the accompanying drawings. FIG. 1 shows a circuit diagram of the power tool 1, and a battery pack 2 mounted on the power tool 1.

The battery pack 2 houses a lithium-ion battery 6, a battery protection circuit 7, a thermistor 8, and a resistor R1. The lithium-ion battery 6 is configured of a plurality of battery cells connected in series. The battery protection circuit 7 is connected to the lithium-ion battery 6. The thermistor 8 is disposed near to or in contact with the lithium-ion battery 6 and detects the temperature of the same. Output from the thermistor 8 is inputted into the battery protection circuit 7.

Normally, the battery pack 2 provided with the power tool 1 is a specialized battery pack designed for a motor 3 (described later) provided in the power tool 1. However, in the preferred embodiment the battery pack 2 connected to the power tool 1 need not be a specialized battery pack that is compatible with the power tool 1, but may be another type of battery pack having a different output voltage from the specialized battery pack. As an example, if the rated voltage of the motor 3 is 14.4 V, then the specialized battery pack 2 provided with the power tool 1 may be configured of four battery cells connected in series, where each cell is 3.6 V. However, in order to improve the versatility of battery packs, the power tool 1 can be connected to battery packs having an output voltage other than 14.4 V, such as 18 V, 25 V, or 36 V. In the preferred embodiment, the rated voltage of the motor 3 is 14.4 V. The battery pack 2 connected to the power tool 1 is configured of five lithium-ion battery cells of 3.6 V per cell connected in series for a total battery voltage of 18 V. However, the battery pack 2 used in the present invention is not limited to a lithium-ion battery, such as a nickel-cadmium battery, nickel-metal hydride battery, and lead-acid battery. Of the examples of secondary batteries given above, a lithium-ion battery is preferable for its high energy density.

The battery protection circuit 7 monitors the battery voltage, discharge current, and temperature of each cell in the lithium-ion battery 6. The battery protection circuit 7 determines that the lithium-ion battery 6 is in an over-discharge state when the voltage of any cell drops below a prescribed value. Upon detecting an over-discharge state, the battery protection circuit 7 outputs an alert signal from a battery shutdown terminal 9 of the battery pack 2. The battery protection circuit 7 also determines that an over-current condition has occurred when the discharge current from the lithium-ion battery 6 exceeds a prescribed value, and outputs the same alert signal through the battery shutdown terminal 9. The thermistor 8 functions to detect the temperature of the lithium-ion battery 6 and to input the detection results into the battery protection circuit 7. If the battery protection circuit 7 determines that the temperature of the lithium-ion battery 6 exceeds a prescribed value (i.e., is too hot), the battery protection circuit 7 outputs the same alert signal through the battery shutdown terminal 9. The battery protection circuit 7 also detects an over-charge condition and the like when the lithium-ion cell set 6 is being charged and outputs an alert signal to the charging device for halting the charging operation.

The power tool 1 has a positive (+) terminal and a negative (−) terminal that connect to the corresponding positive and negative terminals of the battery pack 2. The power tool 1 and battery pack 2 both possess a battery shutdown terminal 9 that connect to each other when the battery pack 2 is mounted on the power tool 1.

The power tool 1 has a motor 3, a trigger switch 4, and a control FET 5 that are connected in series between the positive and negative terminals of the power tool 1. When the battery pack 2 is mounted on the power tool 1 and both the trigger switch 4 and control FET 5 are on, the lithium-ion battery 6 supplies power to the motor 3 for driving the motor 3 to rotate.

The power tool 1 is also provided with a three-terminal regulator 10. The three-terminal regulator 10 outputs a constant voltage of 5 V based on the battery voltage supplied from the lithium-ion battery 6. The 5-V constant voltage is used to power a microcomputer 11 and a storage device 12 described later. Capacitors C1 and C2 are connected to the three-terminal regulator 10 for preventing circuit oscillation.

The power tool 1 further includes a microcomputer 11 and a storage device 12. As described above, the output terminal of the three-terminal regulator 10 is connected to the VDD terminal of the microcomputer 11 across which a voltage of 5 V is applied. The microcomputer 11 is in an operating state when the 5-V is applied to the VDD terminal. The 5-V voltage is similarly applies to the storage device 12 from the output terminal of the three-terminal regulator 10, placing the storage device 12 in an operating state. The storage device 12 is connected to the microcomputer 11, and the microcomputer 11 can read data stored in the storage device 12 and temporarily store this data in RAM (not shown) provided in the microcomputer 11. The microcomputer 11 also includes a timer (not shown).

The storage device 12 stores a first allowable power dissipation W1 (also called the "rated power loss") for the motor 3 and the control FET 5 during a low load period when the current supplied to the motor 3 is small; a second allowable power dissipation W2 for the motor 3 and the control FET 5 during a high load period when the current supplied to the motor 3 is large; and a third allowable power dissipation W3 for the motor 3 and the control FET 5 during a continuous drive period when the driving time of the motor 3 exceeds a prescribed time. Each of the allowable power dissipations W1, W2, and W3 is set to a value that does not exceed an allowable power dissipation W determined for the motor 3 and the control FET 5. The allowable power dissipation for the motor 3 and control FET 5 can be expressed as the product of the current A flowing through the motor 3 (or control FET 5) and the voltage of the lithium-ion battery 6 (W=A*V).

The power tool 1 is also provided with a battery voltage detection circuit 13 configured of resistors R2 and R3 connected in series. The battery voltage detection circuit 13 is connected in parallel to the lithium-ion battery 6. The resistors R2 and R3 divide the battery voltage from the lithium-ion battery 6 so that the voltage inputted into the microcomputer 11 is a divided voltage corresponding to the battery voltage of the lithium-ion battery 6. The microcomputer 11 temporarily stores data in internal RAM (not shown) representing the input battery voltage. A current detection circuit 14 is connected to the microcomputer 11 for detecting current flowing to the motor 3. The current detection circuit 14 outputs the detected current value to the microcomputer 11, and the microcomputer 11 temporarily stores data in RAM representing the current flowing to the motor 3. The current detection circuit 14 is configured of resistors (not shown).

An shutdown circuit 15 is connected to the battery shutdown terminal 9 on the power tool 1 side. The shutdown circuit 15 is also connected to the gate of the control FET 5 through a resistor R8. The shutdown circuit 15 is configured of an FET 15*a*, a resistor R4 connected to the gate of the FET 15*a*, and a resistor R5 connected to between the gate and source of the FET 15*a*. The drain of the FET 15*a* is connected to the gate of the control FET 5 through the resistor R8.

The power tool 1 is also provided with a chopper circuit 16 between a chopping control terminal of the microcomputer 11 and the control FET 5. The chopper circuit 16 is configured of an FET 16*a*, and resistors R6 and R7. The resistor R6 is connected between the chopping control terminal of the microcomputer 11 and the FET 16*a*. The resistor R7 is connected between the gate and source of the FET 16*a*. The FET 16*a* of the chopper circuit 16 is connected to the gate of the control FET 5 via the resistor R8. In other words, both the shutdown circuit 15 and the chopper circuit 16 can turn the control FET 5 on and off. That is, the control FET 5, which is used to interrupt current flowing to the motor 3 in response to an alert signal, also plays a role in chopping control for the battery voltage.

In the preferred embodiment, chopping control is a technique in which the control FET 5 turns the battery voltage (or current) supplied from the lithium-ion battery 6 on and off in order to apply a square-wave current to the motor 3 or control FET 5. Thus, chopping control can regulate the effective voltage/current applied to the motor 3 and control FET 5. The ON duration and OFF duration of the control FET 5 is determined by a square-wave chopping control signal of a prescribed frequency supplied from the chopping control terminal of the microcomputer 11. In other words, the effective voltage applied to the motor 3 and the control FET 5 is determined by the duty cycle and is lower than the battery voltage produced by the lithium-ion battery 6. Accordingly, chopping control can be used to generate a voltage/current that is compatible with the motor 3 and control FET 5 in the power tool 1, even when the battery pack connected to the power tool 1 outputs a higher voltage than the battery pack designed for use with the motor 3.

Resistors R9 and R10 are connected in series between the positive terminal of the motor 3 and the source of the control FET 5. The gate of the control FET 5 is connected to a connection point between the resistors R9 and R10. While an alert signal is not being outputted and while chopping control is not being performed, the control FET 5 is maintained in an ON state by the current flowing through the resistors R9 and R10.

Next, the operations of the power tool 1 and battery pack 2 having the above configurations will be described while referring to the flowchart in FIG. 2.

When the battery pack 2 is mounted on the power tool 1 and a power switch (not shown) on the power tool 1 is turned on, the three-terminal regulator 10 in the power tool 1 generates a 5-V supply voltage based on the battery voltage supplies from the lithium-ion battery 6 and applies this voltage to the microcomputer 11 and storage device 12. When the three-terminal regulator 10 applies this voltage, the microcomputer 11 and storage device 12 enter an operable state, and the microcomputer 11 begins a control process. Under normal conditions, the battery protection circuit 7 does not output an alert signal (low level signal) at this time. Accordingly, the FET 15*a* of the shutdown circuit 15 is turned on, turning on the control FET 5.

At the beginning of the control process, in S1 the microcomputer 11 detects the battery voltage of the lithium-ion battery 6 based on input data from the battery voltage detection circuit 13. In S2 the microcomputer 11 determines whether the trigger switch 4 is on. If the trigger switch 4 is off (S2: NO), the microcomputer 11 returns to S1 and continues to detect the battery voltage while waiting for the trigger switch 4 to turn on. However, if the trigger switch 4 is on (S2: YES), in S3 the microcomputer 11 sets a voltage value a volts that will be applied to the motor 3 to the battery voltage detected in S1. In this example, the microcomputer 11 detects the battery voltage as 18 V.

Next, the microcomputer 11 reads the first allowable power dissipation W1 from the storage device 12 and temporarily stores this data in its internal RAM. The microcomputer 11 calculates a current value x amperes based on the first allowable power dissipation W1 read from the storage device 12 and the voltage value a volts set in S3. The current value x amperes can be found from the following equation.

<current value $x$ amperes>=<first allowable power dissipation $W1$>/<voltage value a volts>

The current value x amperes calculated above denotes the maximum current that can be applied to the motor 3 or control FET 5 during a low load period.

In S4 the microcomputer 11 compares the current value x amperes calculated according to the above equation with the value of current detected by the current detection circuit 14 to determine whether the detected current exceeds the current value x amperes. If the current detected in the current detection circuit 14 exceeds the current value x amperes (S4: YES), indicating that the motor 3 of control FET 5 is in a high load state rather than a low load state, then the microcomputer 11 calculates an effective voltage to apply to the motor 3 or control FET 5 that is consistent with the current actually flowing to the motor 3 and control FET 5 in order to stay within the second allowable power dissipation W2. To this end, in S5 the microcomputer 11 performs chopping control to set the effective voltage applied to the motor 3 to a voltage value b volts. On the other hand, if the current value detected by the current detection circuit 14 is less than the current value x amperes (S4: NO), indicating that power loss in the motor 3 and control FET 5 is within the first allowable power dissipation W1, the microcomputer 11 returns to S2 and allows operations of the power tool 1 to continue. Hence, chopping control is not performed when load on the motor 3 is low, i.e., when the current flowing to the motor 3 is small, since there is no need to limit current applied to the control FET 5 at this time.

As described above, chopping control is the process of controlling the effective voltage applied to the motor 3 or control FET 5 by outputting a square-wave signal (chopping control signal) of prescribed frequency from the chopping control terminal of the microcomputer 11 for turning the control FET 5 on and off. Specifically, when the chopping control signal is high level, the FET 16*a* of the chopper circuit 16 turns on, which turns the control FET 5 on. As a result, the battery voltage from the lithium-ion cell set 6 is applied to the motor 3 while the chopping control signal remains at high level. However, when the microcomputer 11 outputs a low level chopping control signal, the FET 16*a* of the chopper circuit 16 is turned off and, consequently, the control FET 5 is turned off. As a result, a voltage is no longer applied to the motor 3 while the chopping control signal remains at low level. By varying the duty cycle of the chopping control signal, it is possible to change the effective voltage applied to the motor 3 or control FET 5.

When the battery protection circuit 7 of the battery pack 2 outputs an alert signal (low level), this signal is applied to the chopper circuit 16 through the battery shutdown terminal 9 on the power tool 1 side. The signal turns off the FET 16*a* of the chopper circuit 16, thereby turning off the control FET 5. Consequently, an electric current does not flow through the motor 3 and control FET 5, halting operations of the power tool 1. With the control FET 5 serving also as an FET for use in chopping control in the preferred embodiment, the number of parts required for executing chopping control can be minimized.

The voltage value b volts set as the effective voltage in S5 is found from the second allowable power dissipation W2 stored in the storage device 12 for a high load condition of the motor 3 and the value of current detected by the current detection circuit 14. The microcomputer 11 reads this second allowable power dissipation W2 from the storage device 12 and temporarily stores the data in internal RAM. In S5 the microcomputer 11 calculates the voltage value b volts according to the following equation.

<voltage value *b* volts>=<second allowable power dissipation *W*2>/<detected current value>

In this way, a large load current can be limited by reducing the effective voltage applied to the control FET 5. Therefore, operations of the power tool 1 can continue without exceeding the preset allowable power dissipation for the motor 3 and control FET 5, even when the load current is high.

In S6 the microcomputer 11 uses its internal timer to determine whether a current greater than the current value x amperes has been continuously applied for a prescribed time T or greater. Since the value of the current is sampled at prescribed intervals and stored in the RAM of the microcomputer 11, the microcomputer 11 can determine whether a current exceeding the current value x amperes has been detected by the current detection circuit 14 for a period exceeding the prescribed time T based on the number of times a current value exceeding the current value x amperes was sampled and the sampling interval. Alternatively, the microcomputer 11 may make the determination in S6 simply based on the number of times a current value exceeding the current value x amperes was continuously sampled.

When the microcomputer 11 determines that a large current exceeding the prescribed value has been continuously applied to the control FET 5 for the prescribed time T or greater (S6: YES), indicating a continuous high load driving state, in S7 the microcomputer 11 continues to perform chopping control by setting the voltage applied to the control FET 5 to a voltage value c volts, where the voltage value c volts is a lower effective voltage than the voltage value b volts. Since the microcomputer 11 has determined in S6 that the motor 3 was continuously driven, the microcomputer 11 reads the third allowable power dissipation W3 from the storage device 12 for a continuous high load driving state and calculates the voltage value c volts to be applied to the motor 3 based on the third allowable power dissipation W3 and the value of current detected by the current detection circuit 14. The voltage value c volts can be found from the following equation.

<Effective voltage *c* volts>=<third allowable power dissipation *W*3>/<current value *x* amperes>

By setting the voltage value c volts to be applied to the control FET 5 in this way, the microcomputer 11 can prevent power dissipation from exceeding the preset third allowable power dissipation W3 for a continuous high load driving state. In S7 the microcomputer 11 next determines whether the current flowing to the motor 3 exceeds the current value x amperes. The microcomputer 11 performs this determination by comparing the detected current value outputted from the current detection circuit 14 with the current value x amperes stored in internal RAM. If the microcomputer 11 determines that the current applied to the motor 3 exceeds the current value x amperes (S8: YES), the microcomputer 11 returns to S7 and continues to perform chopping control by setting the effective voltage to be applied to the control FET 5 to a voltage value d volts lower than the voltage value c volts. In order to drop the effective voltage to the voltage value d volts, the OFF duration of the control FET 5 must be shorter than that for the voltage value c volts.

While the invention has been described in detail with reference to specific embodiments thereof, it would be apparent to specific embodiments thereof, it would be apparent to those skilled in the art that many modifications and variations may be made therein without departing from the spirit of the invention, the scope of which is defined by the attached claims. For example, in the preferred embodiment the battery voltage detection circuit 13 shown in FIG. 1 detects the battery voltage detection circuit 13 shown in FIG. 1 detects the battery voltage of the lithium-ion cell set 6 through an accrual measurement. However, if the battery pack 2 has a built-in identification resistor representing ID data for its internal cell set, the microcomputer 11 can determine the battery voltage by reading this ID data. With this configuration, the battery voltage detection circuit 13 provided in the power tool 1 of the embodiment shown in FIG. 1 may be omitted, thereby eliminating power dissipation of the lithium-ion battery 6 caused by the battery voltage detection circuit 13. The identification data described above includes the type of battery (e.g., lithium-ion battery cells or the like), and the number of cells.

The above embodiment describes the case of using a battery pack that outputs a higher voltage than that of a battery pack specifically designed for use with the power tool 1. However, it is also possible to use a battery pack that outputs a lower voltage than that of the specialized battery pack. In this case, a switching integrated circuit may be provided in the power tool 1 for boosting the battery voltage supplied from the battery pack mounted on the power tool 1 through DC-DC conversion, and the microcomputer 11 may control this boosted DC voltage.

Further, the present invention may be applied to a drive unit employing an FET for driving a motor, such as brushless DC motor, and the same effects of the invention within the scope of power dissipation in the motor and FET can be obtained by performing the same control described in the preferred embodiment.

REFERENCE SIGNS LIST

1 power tool
2 battery pack
3 motor
4 trigger switch
5 control FET
6 lithium-ion battery
7 battery protection circuit
8 thermistor
9 battery shutdown terminal
10 three-terminal regulator
11 microcomputer
12 storage device
13 battery voltage detection circuit
14 current detection circuit
15 shutdown circuit
16 chopper circuit
R1-R10 resistors
C1, C2 capacitors for preventing circuit oscillation

The invention claimed is:

1. A power tool configured to receive a secondary battery, the power tool comprising:

a drive unit to which the secondary battery is connectable;

a voltage detecting unit configured to detect a battery voltage developed across the secondary battery;

a current detecting unit configured to detect a current flowing through the drive unit;

a storage device; and a control unit configured to output a chopping control signal with a duty cycle changeable in accordance with the battery voltage detected by the voltage detecting unit, a voltage applied to the drive unit from the secondary battery being changed in accordance with the duty cycle changed by the control unit, wherein the secondary battery is one of a plurality of batteries including a first battery and a second battery, wherein the second battery has a greater voltage than the first battery; and wherein the control unit is further configured to perform the following:

read a first allowable power dissipation value from the storage device;

set a first predetermined current value based on the first allowable power dissipation value and a detected battery voltage value of the first battery detected by the voltage detecting unit;

compare a current flowing in the drive unit detected by the current detecting unit to the first predetermined current value;

decrease the duty cycle of the chopping control signal when the detected current flowing in the drive unit has exceeded the first predetermined current value;

set a second predetermined current value, smaller than the first predetermined current value, based on the first allowable power dissipation value and a detected battery voltage value of the second battery detected by the voltage detecting unit;

compare the current flowing in the drive unit detected by the current detecting unit to the second predetermined current value; and decrease the duty cycle of the chopping control signal when the detected current flowing in the drive unit has exceeded the second predetermined current value.

2. The power tool according to claim 1, wherein the control unit executes either one of a first control and a second control, wherein the first control continuously applies the battery voltage provided by the secondary battery to the drive unit, and the second control converts the battery voltage provided by the secondary battery by adjusting the duty cycle of the chopping control signal, the converted battery voltage having an effective voltage different from the battery voltage provided by the secondary battery, at least one converted battery voltage being applied to the drive unit.

3. The power tool according to claim 2, wherein when the secondary battery is either one of a third battery and a fourth battery, and the third battery has a battery voltage equal to or lower than a rated voltage of the drive unit and the fourth battery has a battery voltage higher than the rated voltage, the control unit executes the second control when the secondary battery is the fourth battery.

4. The power tool according to claim 2, wherein the control unit controls an effective voltage and an effective current applied to the drive unit depending on a load imposed thereon so that a power dissipation in the drive unit is below a maximum allowable power dissipation value.

5. The power tool according to claim 1, wherein the battery voltage provided by the secondary battery is different from a rated voltage of the drive unit.

6. The power tool according to claim 1, further comprising a current interrupting unit configured to interrupt current flowing to the drive unit in response to an alert signal alerting that the secondary battery has an error.

7. The power tool according to claim 1, further comprising a current interrupting unit configured to interrupt current flowing to the drive unit in response to an alert signal alerting that the secondary battery has an error, wherein the control unit is further configured to change the current from the secondary battery by turning the current interrupting unit on and off in response to the chopping control signal.

* * * * *